Dec. 19, 1933.   A. KAZENMAIER   1,940,550
BRAKE OPERATING MECHANISM
Filed June 3, 1929

Inventor
August Kazenmaier
by Steward & McKay
his attorneys

Patented Dec. 19, 1933

1,940,550

UNITED STATES PATENT OFFICE 1,940,550

BRAKE OPERATING MECHANISM

August Kazenmaier, Stuttgart, Germany, assignor to Robert Bosch Aktiengesellschaft, Stuttgart, Germany Application June 3, 1929, Serial No. 368,107, and in Germany November 10, 1928

10 Claims. (Cl. 188—3)

The present invention relates to brake mechanisms for tractors and trailer vehicles drawn thereby in which brake mechanisms actuated by differential fluid pressure are provided on all the vehicles for commonly braking the tractor and trailer vehicles and in which moreover another separated brake mechanism on the tractor is provided for braking this vehicle independently of the first mentioned mechanism. In the known brake mechanisms of this type both the tractor and the trailer can be braked by the fluid pressure brake, but there exists the disadvantage that only the tractor and not also the trailer or trailers can be braked on operation of the second or auxiliary tractor brake which as a rule is the adjustable hand brake. Such braking mechanisms are therefore unsatisfactory, particularly in the case of tractor vehicles with heavy trailers which sometimes require to be held stationary by means of a hand brake on inclines.

According to this invention, therefore, a valve is connected to the operating lever of the second tractor brake mechanism in such a way that when said lever is operated by the driver to apply the second tractor brake it also operates said valve so that the fluid pressure controlled brakes of the trailer are applied simultaneously. If the brakes of the trailer are held released by fluid pressure, the brake pipe of the trailer must be connected with the atmosphere in order to set up a braking action in the trailer. The valve for connecting the trailer brake pipe with the atmosphere may be the usual braking valve used for the trailers and in this case the brake lever for the second brake of the tractor is coupled with the control of the pressure or vacuum operated trailer brake, so that on applying this second tractor brake the trailers are also braked.

A further important feature of the invention is that the tractor servo brake is not operated on moving the braking lever for the second tractor brake.

A form of construction according to the invention is shown by way of example in the accompanying drawing.

Figure 1:
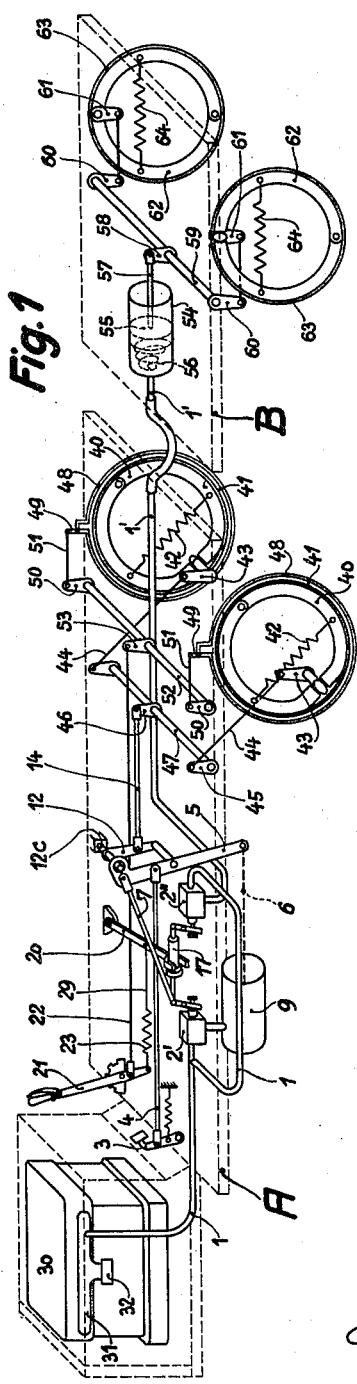
Fig. 1 shows a diagrammatic view representing braking mechanisms for a tractor and a trailer vehicle in which the tractor brake is applied by vacuum and the trailer brake is released by vacuum.

Referring to Figure 1 "A" represents a tractor vehicle and "B" a trailer vehicle drawn thereby. The tractor is provided with an internal combustion engine 30 for propelling the tractor and the trailer coupled together in any usual manner. The tractor engine has an intake manifold 31 with a carburettor 32. A pipe 1 leads from the intake manifold 31 to each of elements 2' and 2" of a valve arrangement for the tractor and trailer brake which have a common control. A pipe 1' leads from the valve element 2" to the trailer.

The tractor brake is a suction brake of known construction. A rod 4 is articulated to a pedal lever 3 and connected with the piston 8 of a braking cylinder 9 of the tractor by an oscillating lever 5 and a chain 6. Lever 5 is pivotally connected at $12^b$ to a lever 12, the other end of which is carried by a fixed shaft $12^c$. To the lever 12 is articulated a rod 14 which leads to a brake mechanism described in a later part of the specification. The oscillating lever 5 has a bore 13 which gives the limits for the movement of the lever 5. A rod 7 connects the point $7^b$ of the lever 5 with a lever 10 which is coupled with a lever 11. These two levers 10 and 11 control the valves 2' and 2". A rod 15 is articulated to the lever 10 and has an end disc 16 which is forced by a spring 19 against a bush 18 rigidly secured by screw threads in, and closing the open end of, sleeve 17. The other end of this sleeve is connected with the lever 11. A lever 20 is articulated to a hand brake lever 21 by means of a rod 29 and a spring 23 which pulls the forked end of lever 20 against a flange of the bush 18.

The casing of the valve 2' is divided into two chambers 33' and 34' by a wall 35' with a bore 36'. The chamber 33' is connected to the suction pipe 1 and to the brake cylinder 9, the chamber 34' is open to atmosphere. Two valve discs 37' and 38' are pressed against their seats by a spring 39' and may be moved by the lever 10. The valve element 2" is constructed in the same manner as the valve element 2', the corresponding parts being indicated with the same basic reference numbers. Normally, when the car is driving, member 37' of valve 2' is closed and member 38' is held open so that the tractor brake cylinder is connected with the atmosphere, whereas the member 37" is held open and member 38" is held closed in order to maintain the trailer cylinder in constant communication with the source of vacuum.

The servo operated brakes of the tractor may be shoe brakes with shoes 40, brake drums 41, release springs 42, brake operating levers 43, links 44, brake levers 45 and 46 and a common brake shaft 47. The lever 46 is connected with the rod 14.

The second brake of the tractor may be a manually operated band brake, the brake bands 48 of which may act on the outside of the brake drums 41. The brake band is operated by a lever 49 which is connected with a lever 50 by a link 51. The lever 50 is attached to a brake shaft 52 which is coupled to the hand brake lever 21 by a lever 53 and a rod 22. The hand brake lever 21 may be held in any position of adjustment in any usual manner.

The brake of the trailer consists of a brake cylinder 54 with a piston 55 and a spring 56 in the cylinder 54 tending to move the piston 55 to the open end of the brake cylinder 54 in order to apply the trailer brakes, when the suction is released. The rod 57 of the piston is articulated to a lever 58 connected with a brake shaft 59, levers 60 and brake operating levers 61 for the brake shoes 6.. within the brake drums 63. The retracting springs are indicated at 64.

Figure 2:
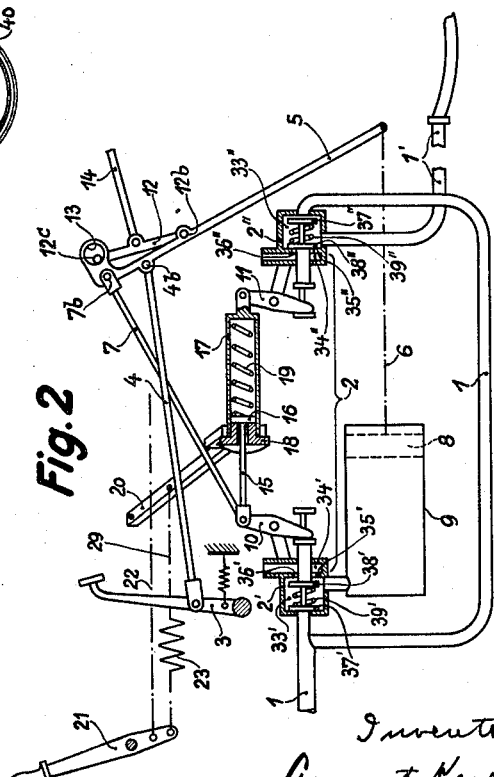
Fig. 2 shows a detailed view of the control of these brakes.

The mechanism operates as follows:

On moving the pedal lever 3, the servo brake of the tractor is regulated in known manner by the valve element 2'. The position occupied by the members in Figs. 1 and 2 corresponds to the released position that is to say the cylinder 9 is in communication with the atmosphere because the valve disc 37' is seated and the disc 38' is unseated.

If the pedal 3 is depressed the lever 5 oscillates in the same direction about the point 12$^b$. The effect of this displacement of the lever 5 is that the valve disc 38' is seated and then the valve disc 37' is unseated, so that a communication is established between the cylinder 9 and the suction pipe 1.

This causes the piston 8 to be drawn to the left side. The oscillating lever 5 then moves in clockwise direction about a point 4$^b$ which acts for the time as pivot. The lever 5 carries with it in its movement the point 12$^b$ and the link 12 and consequently the rod 14 and the brake mechanism connected with it.

This movement ceases as soon as the bore 13 of the oscillating lever 5 has reached an intermediate position in which both the valve discs 37' and 38' are seated. If the brake lever 3 is allowed to return, the brakes of the tractor will be released on account of the fact that the oscillating lever 5 will be moved in such a way that the left side of its bore 13 will touch the shaft 12$^c$ as to allow the valve element 2' to connect the cylinder 9 to the atmosphere. The vacuum in the cylinder 9 is then released and the piston 8 as well as the lever 5 and the whole brake mechanism attached to the rod 14 will be moved into the released position by the release springs 42.

The rod 15 is articulated to the lever 10. On the movement of the lever 10 in an anti-clockwise direction (braking direction) the end disc 16, therefore, presses against the bush 18 in the sleeve 17 and forces the sleeve 17 and the control lever 11 to follow the movement of the lever 10. The spring 39'' of the valve element 2'' is allowed to press the valve disc 37'' against its seat interrupting the connection of the trailer brake pipe 1' with the suction pipe 1. On further movement of the lever 11 the valve disc 38'' will be unseated and a communication will be established between the trailer brake cylinder 54 and the atmosphere to allow the brake spring 56 of the trailer brake cylinder to move the piston 55 in order to apply the brakes of the trailer.

On the movement of the lever 10 in clockwise direction (brake releasing direction), the end disc 16 presses against the spring 19 which is strong enough to overcome the resistance of the controlling parts of the valve element 2'' without being shortened. The sleeve 17 will be removed to the right and the valve disc 37'' will be unseated after the seating of the valve disc 38''. The air is again sucked out of the cylinder 54 and the piston 55 is drawn into the cylinder 54 compressing the brake spring 56. The brake shoes 62 are released by the release springs 64.

The valve element 2'' therefore partakes always in the movement of the valve element 2' i. e. the tractor and trailer brakes are regulated in common by the pedal lever 3, exactly as if a rigid connection would exist between the control levers 10 and 11.

The conditions are different on actuating the hand brake lever 21. On retracting the hand brake lever 21 the lever 20 is moved in clockwise direction. The end of this lever is thereby pressed against the screwed bush 18 so that the sleeve 17 is withdrawn to the left and the lever 11 is turned in an anti-clockwise direction, opening thereby the valve 38'' after having closed the valve 37'' in order to connect the brake pipe 1' with the atmosphere. The partial vacuum in the spring-supporting portion of the trailer brake cylinder 54 is thereby destroyed and owing to this pressure change, the spring 56 pushes the piston 55 and the piston rod 57 to the right and applies the brake shoes 62.

The control lever 10 of the valve element 2', however, does not follow the movement of the sleeve 17 directed to the left, because the spring 19 is not strong enough to overcome the resistance of the element 2' after seating both discs 37' and 38' and of the tractor brake rod. The spring 19 is therefore compressed and the valve element 2' remains in the brake release position.

On drawing the hand lever 21 not only the valve control rod 29 but also the rod 22 of the second tractor brake is moved to the left withdrawing thereby the parts 53, 52, 51, 49 and applying the brake bands 47 to the brake drums 41 of the tractor.

The hand operated tractor brake can still be fully applied after the control lever 11 of the trailer brake valve 2'' has reached its end position in which is fully opened the atmosphere side of said valve. This is possible by the insertion of a suitably dimensioned spring 23 between the hand lever 21 and the control lever 20 which yields as soon as the resistance of the trailer brake valve 2'' is greater than the original tension of the spring 19.

On releasing the hand brake lever 21, the spring 19 again moves the control lever 11 into the off-position of the trailer brake.

I claim:

1. Brake operating mechanism for tractor and trailer vehicles comprising at least one fluid pressure cylinder on a tractor vehicle and at least one fluid pressure cylinder on a trailer vehicle, a piston in each of said cylinders connected to tractor and trailer brakes respectively, a source of fluid pressure connected to said cylinders, valve means for controlling the flow of fluid relatively to said tractor cylinder, further valve means for controlling the flow of fluid to said tractor cylinder, common means for operating all said valve means of said cylinders, manual means for applying other brakes on the tractor vehicle independently of the tractor fluid pressure brakes, and connecting means between said manual means and the valve means of the trailer cylinder for operating said trailer valve means on operation of said manual means without operation of valve means of the tractor cylinder.

2. Brake mechanism for tractor and trailer vehicles comprising vacuum applied brakes on a tractor vehicle, vacuum released brakes on a trailer vehicle, common means for applying said brakes, auxiliary brakes on the tractor vehicle, manual means for applying said auxiliary brakes, and connecting means between said manual means and the vacuum released brakes on the trailer for applying the trailer brakes on application of the auxiliary tractor brakes without application of the tractor vacuum applied brakes.

3. Brake operating mechanism for tractor or trailer vehicles comprising fluid pressure mechanism for brakes on a tractor, fluid pressure mechanism for brakes on a trailer, valve means and a valve lever for each of said mechanisms, operating means connected to the valve lever of the tractor mechanism, elements connected to said levers and adapted for operative interengagement on movement of said valve lever of the tractor mechanism in one direction only, auxiliary brake operating means on the tractor and connecting means between said auxiliary brake operating means and said element connected to the valve lever of the trailer mechanism for operation of the trailer brakes on operation of said auxiliary brake operating means without operation of the tractor fluid pressure brakes.

4. Brake operating mechanism for tractor and trailer vehicles comprising fluid pressure mechanism for brakes on a tractor, fluid pressure mechanism for brakes on a trailer, valve means and a valve lever for each of said mechanisms, operating means connected to the valve lever of the tractor mechanism, auxiliary operating means for other brakes on the tractor independent of the tractor fluid pressure brakes, a sleeve pivoted at one end to the valve lever of the trailer mechanism, a bush secured to the other end of said sleeve, a rod pivoted at one end to the valve lever of the tractor mechanism passing through said bush and adapted to engage the bush on movement in one direction only, a spring within said sleeve adapted to abut against the end of said rod, and connecting means between said auxiliary operating means and said bush for operating the trailer mechanism on operation of said auxiliary means without operation of the tractor fluid pressure mechanism.

5. Brake operating mechanism for tractor and trailer vehicles comprising fluid pressure mechanism for brakes on a tractor, fluid pressure mechanism for brakes on a trailer, valve means and a valve lever for each of said mechanisms, operating means connected to the valve lever of the tractor mechanism, auxiliary operating means for other brakes on the tractor independent of the tractor fluid pressure brakes, a sleeve pivoted at one end to the valve lever of the trailer mechanism, a bush secured to the other end of said sleeve, a rod pivoted at one end to the valve lever of the tractor mechanism passing through said bush and adapted to engage the bush on movement in one direction only, a spring within said sleeve adapted to abut against the end of said rod, and resilient connecting means between said auxiliary operating means and said bush for operating the trailer mechanism on operation of said auxiliary means without operation of the tractor mechanism.

6. Brake operating mechanism for tractor and trailer vehicles comprising fluid pressure mechanism for brakes on a tractor, fluid pressure mechanism for brakes on a trailer, valve means and a valve lever for each of said mechanisms, operating means connected to the valve lever of the tractor mechanism, auxiliary operating means for other brakes on the tractor independent of the tractor fluid pressure brakes, a sleeve pivoted at one end to the valve lever of the trailer mechanism, a bush secured to the other end of said sleeve, a flange on said bush, a rod pivoted at one end to the valve lever of the tractor mechanism passing through said bush and adapted to engage the bush on movement in one direction only, a spring within said sleeve adapted to abut against the end of said rod, and pivotally mounted forked lever adapted to engage at one end with the flange of said bush and connected through resilient means with said auxiliary operating means.

7. Brake mechanism for tractor and trailer vehicles comprising fluid pressure controlled brakes on a tractor vehicle, fluid pressure controlled brakes on a trailer vehicle, common means for simultaneously applying said fluid pressure controlled brakes, manually operated brakes on the tractor vehicle independent of the tractor fluid pressure brakes, and common means for applying the manually operated brakes on the tractor and the fluid pressure controlled brakes on the trailer.

8. Brake mechanism for tractor and trailer vehicles comprising fluid pressure controlled brakes on a tractor vehicle, fluid pressure controlled brakes on a trailer vehicle, common means for simultaneously applying said fluid pressure controlled brakes, manually operated brakes on the tractor vehicle independent of the tractor fluid pressure brakes, and common means for applying the manually operated brakes on the tractor and the fluid pressure controlled brakes on the trailer without operation of the fluid pressure controlled brakes on the tractor.

9. Brake mechanism for tractor and trailer vehicles comprising fluid pressure mechanism for controlling brakes on a tractor, fluid pressure mechanism for controlling brakes on a trailer, common operating means for said fluid pressure mechanisms, manual means for operating other brakes and connecting means between said manual means and the fluid pressure mechanism of the trailer brakes for operating said trailer fluid pressure mechanism on operation of said manual means without operation of the tractor fluid pressure mechanism.

10. Brake mechanism for tractor and trailer vehicles comprising brake mechanism on a tractor, fluid pressure controlled brake mechanism on a trailer, common means for operating said brake mechanisms, a second brake mechanism on said tractor independent of the first tractor brake mechanism, and common means for operating said second tractor brake mechanism and the fluid pressure controlled brake mechanism on said trailer without operating said first tractor brake mechanism.

AUGUST KAZENMAIER.